(12) United States Patent
Menon et al.

(10) Patent No.: US 10,356,752 B1
(45) Date of Patent: Jul. 16, 2019

(54) EARLY TERMINATION FOR PAGING SEARCH IN COMMON SEARCH SPACE

(71) Applicant: QUALCOMM Incorporated, San Diego, CA (US)

(72) Inventors: Srikanth Menon, Hyderabad (IN); Raghavendra Shyam Ananda, Hyderabad (IN); Ganesh Nagamani, Hyderabad (IN); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/026,002

(22) Filed: Jul. 2, 2018

(51) Int. Cl.
*H04W 68/02* (2009.01)
*H04W 52/02* (2009.01)
*H04B 17/318* (2015.01)

(52) U.S. Cl.
CPC .......... *H04W 68/02* (2013.01); *H04B 17/318* (2015.01); *H04W 52/0225* (2013.01)

(58) Field of Classification Search
CPC ..... H04L 5/0048; H04W 48/12; H04B 17/318
USPC ............... 370/281, 329, 252, 242; 455/550.1
See application file for complete search history.

(56) References Cited

U.S. PATENT DOCUMENTS

| | | | | |
|---|---|---|---|---|
| 2012/0281576 | A1* | 11/2012 | Yamada ................ | H04L 1/0046 370/252 |
| 2016/0127097 | A1* | 5/2016 | Chen .................... | H04L 5/0051 370/330 |
| 2017/0150367 | A1* | 5/2017 | Han ....................... | H04L 5/001 |
| 2017/0331670 | A1* | 11/2017 | Parkvall .............. | H04J 11/0079 |
| 2018/0279268 | A1* | 9/2018 | You .................... | H04W 72/042 |

\* cited by examiner

*Primary Examiner* — Kiet M Doan

(57) ABSTRACT

Systems, apparatuses, and methods for early termination of paging search in CSS. A user equipment (UE) may search a common search space (CSS) for a paging indication that may be repeated, up to and including, a maximal number of times in the CSS. A receive power of a reference signal (RS) may be measured for a paging candidate for a number of repetitions, which may be associated with a partial time-frequency region of the CSS. The UE may terminate the paging search based at least on the receive power of the RS and may declare no paging is present without monitoring or searching the full CSS associated with the maximal number of repetitions.

30 Claims, 8 Drawing Sheets

EARLY TERMINATION FOR PAGING SEARCH IN COMMON SEARCH SPACE

BACKGROUND

This disclosure relates generally to wireless communication, and more specifically, to techniques for early termination for paging search in common search space (CSS).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

UEs may be IoT devices that can wirelessly connect to a server, a network, or the Internet. Examples of IoT radio access technology may include NarrowB and Internet of Things (NB-IoT) developed by the 3rd Generation Partnership Project (3GPP). In some cases, IoT devices may provide for automated or machine-type communication that allows the devices to communicate with one another or a base station without human intervention. For example, an IoT device may integrate sensors or meters to measure or capture information and relay that information to a central server or application program that can make use of the information or present the information to humans interacting with the program or application. In some cases, IoT devices may operate within a limited or narrow frequency band as opposed to a broad system bandwidth within which the IoT radio access technology is deployed. Many IoT UEs may operate in low power mode and may be implemented as low cost devices.

In a wireless network, a base station and/or a network entity may inform one or more UEs of certain information via paging; for example, a UE may be paged for system information update, incoming call, and so on. A UE in idle mode may be configured to monitor paging on a paging cycle, during which the UE may periodically search for a potential paging indication. In some cases, the UE may operate in a Discontinuous Reception (DRX) mode whose on/off durations may coincide with the configured paging cycle. A paging cycle may determine how frequently UE would check for paging; for example, for a paging cycle of 128 radio frames a UE may wake up to search for paging every 128 radio frames. Within the duration of a paging cycle, a UE may search for paging on a particular paging occasion assigned to or configured for the UE. A base station may schedule different UEs on different paging occasions even though these UEs share the same paging cycle.

SUMMARY

Systems, apparatuses, and methods are provided for early termination for paging search. A UE may search a common search space for a paging indication that may be repeated, up to and including, a maximal number of times in the CSS. A receive power of a reference signal (RS) may be measured for a paging candidate for a number of repetitions. The paging candidate may be associated with or correspond to a partial time-frequency region of the CSS. The receive power of the RS, alone or in conjunction with other measurements, may indicate the absence (or presence) of the RS and/or a channel carrying the paging indication. The UE may terminate the paging search based at least on the receive power of the RS and may declare no paging is present without monitoring or searching the full extent of the CSS (corresponding to the maximal number of repetitions).

In an aspect, a method for wireless communications is provided. The method may include searching a CSS for a paging indication on a carrier, wherein the CSS is a time-frequency region associated with a maximal number of repetitions of a control channel carrying the paging indication. The method may also include measuring a receive power of an RS associated with a paging candidate for a number of repetitions of the control channel. Furthermore, the method may include determining whether to terminate the search based at least on the measured receive power of the RS when the paging indication is not successfully decoded.

In another aspect, a UE is provided that may include a receiver and a processor coupled to a memory. The receiver may be configured to receive an RS and a control channel on a carrier. The processor may be configured to search a CSS for a paging indication on the carrier, wherein the CSS is a time-frequency region associated with a maximal number of repetitions of the control channel carrying the paging indication. The processor may be further configured to measure a receive power of an RS associated with a paging candidate for a number of repetitions of the control channel. The processor may be further configured to determine whether to terminate the search based at least on the measured receive power of the RS when the paging indication is not successfully decoded.

In another aspect, an apparatus of wireless communication is provided. The apparatus may include means for searching a CSS for a paging indication on a carrier, wherein the CSS is a time-frequency region associated with a maximal number of repetitions of a control channel carrying the paging indication. The apparatus may also include means for measuring a receive power of an RS associated with a paging candidate for a number of repetitions of the control channel. Furthermore, the apparatus may include means for determining whether to terminate the search based at least on the measured receive power of the RS when the paging indication is not successfully decoded.

In yet another aspect, a non-transitory computer-readable medium having instructions stored thereon is provided. The instructions may include codes executable for a UE to perform searching a CSS for a paging indication on a carrier, wherein the CSS is a time-frequency region associated with a maximal number of repetitions of a control channel carrying the paging indication. The instructions may also include codes for measuring a receive power of an RS associated with a paging candidate for a number of repetitions of the control channel. Furthermore, the instructions may include codes for determining whether to terminate the search based at least on the measured receive power of the RS when the paging indication is not successfully decoded.

In various aspects, a set of paging candidates may be identified for multiple numbers of repetitions of the control channel within the CSS. The set of paging candidates may be decoded for the paging indication.

In various aspects, a receive power of the control channel may be measured. The search may be terminated if a ratio of the measured receive power of the control channel to the measured receive power of the RS is less than a threshold. In some cases, the threshold may be based on a known transmit power ratio between the control channel and the RS.

In various aspects, the search may be terminated if the measured receive power of the RS of a non-anchor carrier is less than a threshold. In some cases, the threshold may be based on an expected power of the RS, which may be derived from a receive power of an anchor carrier based on a power offset between the anchor carrier and the non-anchor carrier.

Various features and advantages of this disclosure are described in further details below. Other features will be apparent from the description, drawings, and/or the claims.

BRIEF DESCRIPTION OF THE DRAWINGS

Illustrative and non-limiting drawings are provided to aid in the description of various aspects and implementations. Unless specified otherwise, like reference symbols indicate like elements.

DETAILED DESCRIPTION

In NB-IoT, a UE may search for paging in a common search space corresponding to a paging occasion assigned to the UE. The CSS may or may not contain a control channel carrying a paging indication, and in some cases, the UE may monitor the full CSS before it can declare no paging is present on the paging occasion.

To ensure sufficient coverage, a NB-IoT system may provision a large CSS so that UEs in poor radio conditions may still receive paging. For example, the CSS may be configured to support a large number (e.g., 2048) of repetitions of the control channel, even though a smaller number of repetitions may suffice for UEs under good radio conditions. Since a UE may not know in advance whether a control channel for paging would be present in the CSS, and if present, how many times the control channel would be repeated, the UE may try to decode the control channel under multiple hypotheses on the repetition, which may be referred to as "blind decoding."

Monitoring the full CSS (e.g., blind decoding) may entail substantial processing time and/or power consumption. For a UE under good channel conditions, the UE may normally decode a control channel without the help of large number of repetitions, and a base station may have transmitted the control channel with small number of repetitions. But if such a UE does not decode the control channel at a smaller repetition level, a challenge may arise on whether the UE would try for larger repetitions until the maximal repetition (corresponding to the full CSS) before it can declare no paging is present in the full CSS. As many IoT devices are designed for low power applications, early termination of the paging search may be desirable for reducing UE's power consumption and computation burden.

Aspects of the disclosure introduced above are described below in the context of a wireless communications system. Examples of designs and techniques supporting early termination for paging search in CSS are then described. Aspects of the disclosure are further illustrated by and described with reference to various apparatus diagrams, system diagrams, and flowcharts. Although some of the examples may be described in the context of NB-IoT, the scope of the present disclosure (including the claims) are not limited solely to NB-IoT and may cover other context or systems as well. For example, a common search space containing a paging indication with repetitions may apply in a non-NB-IoT context.

Figure 1:
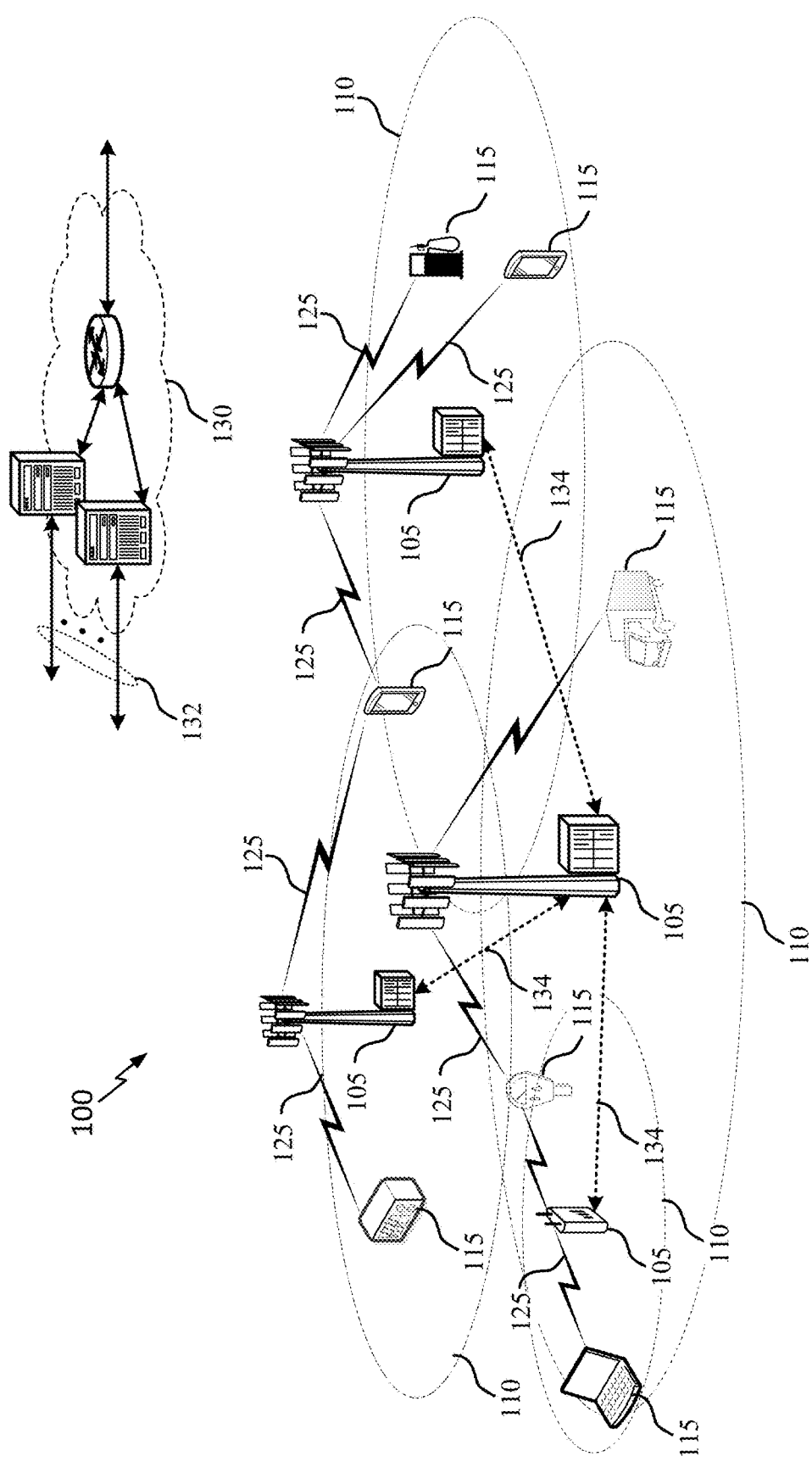
FIG. 1 illustrates a wireless communications system in accordance with the present disclosure.

FIG. 1 illustrates, as an example, a wireless communications system 100 in accordance with the present disclosure. The wireless communications system 100 includes base stations 105, UEs 115, and a core network 130. In some examples, the wireless communications system 100 may be a Long Term Evolution network, an LTE-Advanced (LTE-A) network, an LTE-A Pro network, or a New Radio network.

UEs 115 may be dispersed throughout the wireless communications system 100, and each UE 115 may be stationary or mobile. A user equipment may also be referred to as a subscriber station, an access terminal, a remote terminal, a handset, a user device, or generally a wireless communication device or some other suitable terminology in the context.

Base stations 105 may wirelessly communicate with UEs 115 via communication links 125. A communication link 125 include uplink transmissions from a UE 115 to a base station 105, or downlink transmissions from a base station 105 to a UE 115, or both. Downlink transmissions may also be called forward link transmissions while uplink transmissions may also be called reverse link transmissions. A base station may also be referred to as a base transceiver station, a radio base station, an access point, or some other suitable terminology in the context. Wireless communications system 100 may include different types of base stations 105 (e.g., macro or small cell base stations). Base stations 105 and/UEs 115 may communicate via one or more antennas on one or more communication links 125 to support various Multiple-Input and Multiple Output (MIMO) techniques, such as spatial diversity, multiplexing, or transmit or receive beamforming, and so on. Multiple antennas may be co-located or distributed in diverse geographic location.

Wireless communications system 100 may operate using one or more licensed or unlicensed frequency bands in spectrum. For example, frequency bands in the ultra-high frequency (UHF) region (300 MHz to 3 GHz) are known as decimeter bands, since the wavelengths range from approximately one decimeter to one meter in length. Frequency bands from in a super high frequency (SHF) region (3 GHz to 30 GHz) are known as the centimeter bands. The SHF region includes bands such as the 5 GHz industrial, scientific, and medical (ISM) bands, which may be used opportunistically by devices that can tolerate interference from other users. Frequency bands in extremely high frequency (EHF) region (30 GHz to 300 GHz) are known as the millimeter bands.

Each base station 105 may be associated with a particular geographic coverage area 110 in which communications with various UE 115s are supported. The geographic coverage area 110 for a base station 105 may be divided into one or more sectors and each sector may be associated with a cell. For example, each base station 105 may provide communication coverage for a macro cell, a small cell, a hot spot, or other types of cells, or various combinations thereof. The term "cell" refers to a logical communication entity used for communication with a base station 105 (e.g., over a carrier), and in some context, may also refer to a portion of a geographic coverage area 110 (e.g., a sector) over which the logical entity operates. A cell may be associated with an identifier for distinguishing neighboring cells operating via the same or a different carrier. The term "carrier" may generally refer to a set of radio frequency spectrum resources having a defined organizational structure for supporting uplink or downlink communications over a communication link 125. For example, a carrier may include a portion of a radio frequency spectrum referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include various network entities, such as a mobility management entity (MME), a serving gateway (S-GW), and a Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

The wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds ($Tf=307200*Ts$). The radio frames may be identified by a system frame number (SFN) ranging from 0 to 1023. Each frame may include ten subframes numbered from 0 to 9, and each subframe may have a duration of 1 millisecond (ms). A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods.

A resource element (RE) may consist of one symbol period (e.g., a duration of one modulation symbol) and one subcarrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

For illustrative purposes, the following examples and figures may be described with reference to UE 115 and base station 105 of FIG. 1; however, types of UEs or base stations may be used in same or other examples without limiting the scope of the present disclosure.

Figure 2:
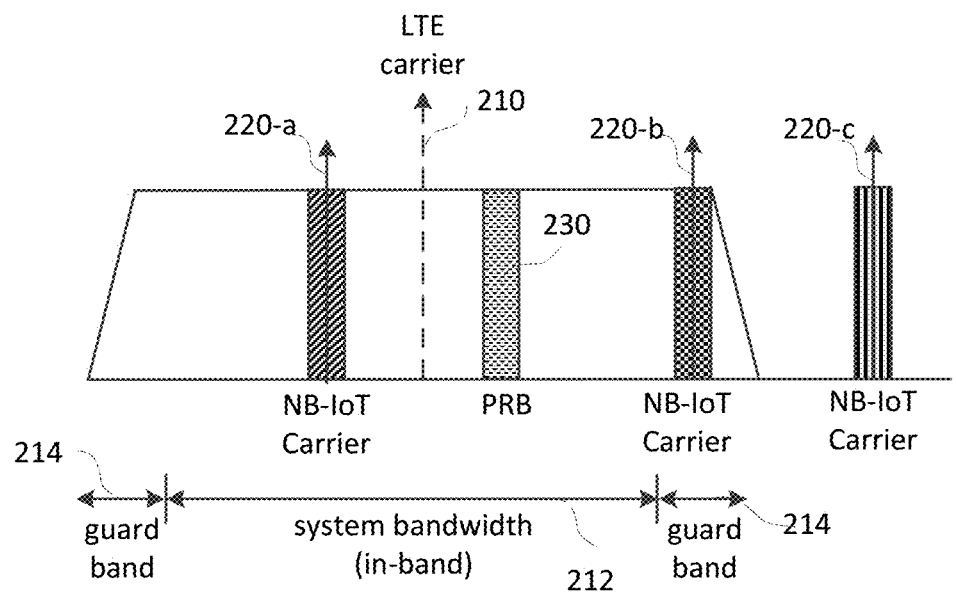
FIG. 2 illustrates NB-IoT in spectrum deployment in accordance with the present disclosure.

FIG. 2 illustrates, as an example, NB-IoT spectrum deployment in accordance with the present disclosure. The underlying radio access technology for NB-IoT may differ from LTE, but an NB-IoT carrier may efficiently coexist within an LTE carrier. An operator may deploy an NB-IoT system using a small portion (e.g., 200 KHz) of its existing spectrum. As shown in this example, an NB-IoT carrier 220-a may be deployed in-band within an LTE carrier 210, that is, the NB-IoT carrier 220-a is within a system bandwidth 212 (e.g., an overall bandwidth of available communication resources) of the LTE carrier 210. NB-IoT carriers may also be deployed within a guard-band 214 (e.g., NB-IoT carrier 220-b) or deployed out-of-band (e.g., NB-IoT carrier 220-c). Compared to a wideband LTE carrier 210 (e.g., 10 MHz), the bandwidth of a NB-IoT carrier (e.g., 220-a, 220-*b*, or 220-*c*) may be limited to a much narrower bandwidth of 180 KHz, which may be equal to the bandwidth of a physical resource block (PRB) 230 in LTE.

The NB-IoT downlink may be based on Orthogonal Frequency Division Multiple Access (OFDMA) with same OFDM numerology as LTE (e.g., 15 kHz subcarrier spacing, OFDM symbol lengths, cyclic prefix lengths, etc.) to achieve coexistence performance with LTE in the downlink. NB-IoT may provide various downlink physical channels or signals. For example, a Narrowband Primary Synchronization Signal (NPSS) and a Narrowband Secondary Synchronization Signal (NSSS) may be used by an NB-IoT user equipment to perform cell search. Narrowband Physical Broadcast Channel (NPBCH) may carry system information in a master information block (MIB). A Narrowband Physical Downlink Control Channel (NPDCCH) may carries scheduling information for both downlink and uplink data channels. The NPDCCH may further carry HARQ acknowledgment information for uplink data channel as well as paging indication and random access response (RAR) scheduling information. Narrowband Physical Downlink Shared Channel (NPDSCH) may carry data from higher layers as well as paging message, system information, and the RAR message. Narrowband Reference Signal (NRS) may provide channel reference for demodulation of the downlink channels.

The NB-IoT uplink may use multi-tone transmission based on, for example, the same Single Carrier (SC) OFDM numerology used for coexistence with LTE. In addition, the uplink may support signal-tone transmission. NB-IoT may provide various uplink physical channels or signals. For example, a Narrowband Physical Random Access Channel (NPRACH) may carry preambles for random access. These NPRACH preambles may be limited to 180 KHz in bandwidth and consists of four symbols groups, each having one cyclic prefix and five symbols. Each NPRACH preamble symbol may be modulated on a 3.75 KHz tone. A Narrowband Physical Uplink Shared Channel (NPUSCH) may carry uplink data or HARQ feedbacks.

Figure 3:
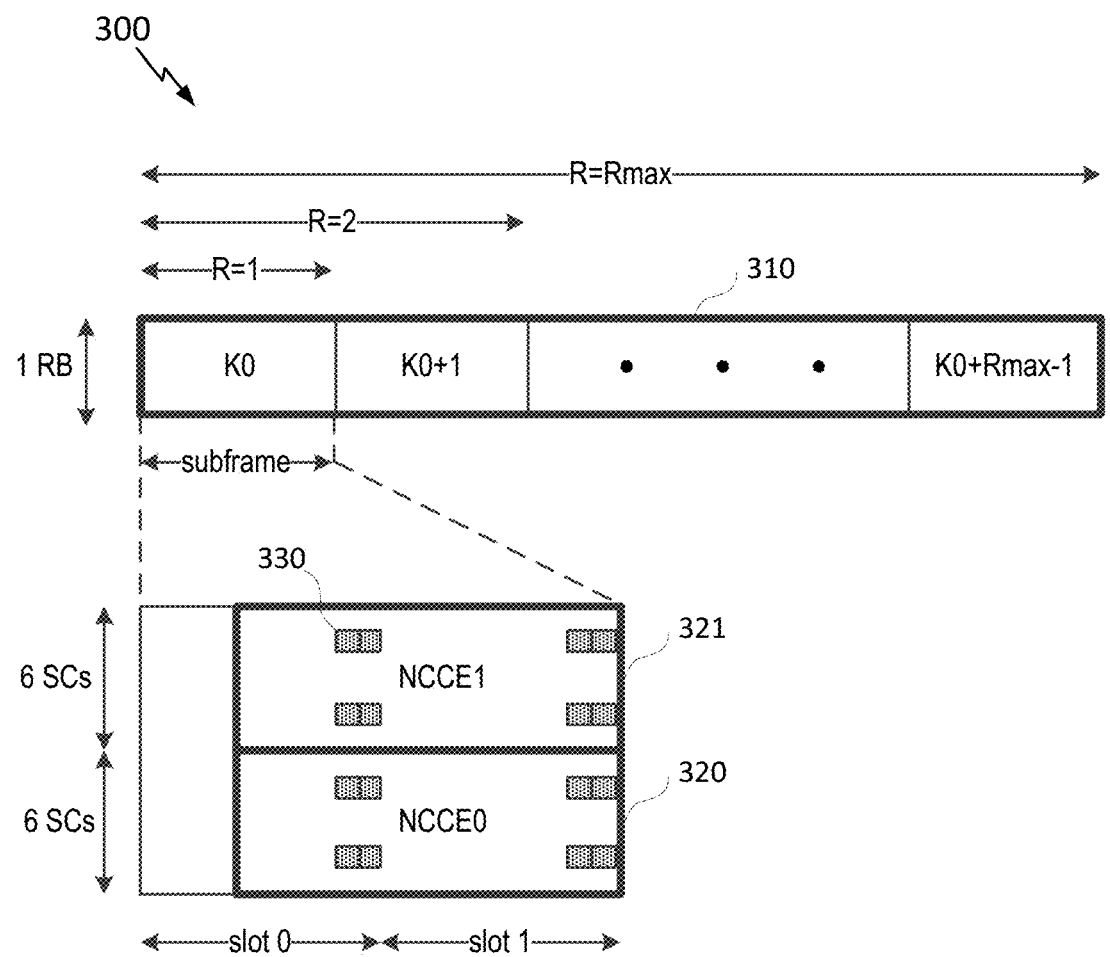
FIG. 3 illustrates a time-frequency frame structure of a common search space for paging in accordance with the present disclosure.

FIG. 3 illustrates, as an example, a time-frequency frame structure 300 of a common search space for paging in accordance with the present disclosure. The time-frequency frame structure 300 may be based on an NB-IoT radio access technology described in FIG. 2.

A common search space 310 defines a time and frequency resource region within which one or more UEs may search for a control channel, such as NPDCCH, carrying a paging indication. The starting location of the common search space 310 may be based on a paging occasion configured for a UE. For example, the starting subframe index k0 may be determined from locations of NB-IoT paging opportunity subframes. The common search space 310 may be configured with cell-specific parameters for all or a group of UEs in a cell, as opposed to a UE-specific search space that is configured with UE-specific parameters for a particular UE.

Generally a paging indication may refer to any information, such as a control information format, an identifier, a bit field, and/or a message, that indicates a UE is paged. In some case, the control channel may be scrambled by a particular identifier for paging; for example, cyclic redundancy check bits of an NPDCCH payload may be scrambled by a Paging-Radio Network Temporary Identifier (P-RNTI). Upon successful decoding of a NPDCCH with a P-RNTI, a UE would be alerted for the presence of a paging and may further obtain a paging message by decoding a data channel (e.g., NPDSCH) scheduled by the NPDCCH.

Within the common search space 310, a control channel may be repeated a number of times, up to and including a maximal number (Rmax) of repetitions. For example, an NPDCCH can be repeated in one or more consecutive subframes (which may exclude intervening subframes used for carrying system information blocks). As illustrated in this example, the common search space 310 may occupy one resource block in frequency across Rmax subframes in time, supporting Rmax subframe repetitions of an NPDCCH.

Within a subframe, a control channel may occupy a set of resource elements in a control region. In some cases, the control region may be divided into two sub-regions: a sub-region 320 and a sub-region 321, of six subcarriers (i.e., one half of a resource block) each. The control region may start from an OFDM symbol of the first slot (slot 0) and last till the end of the second slot (slot 1). For an in-band NB-IoT carrier, the NB-IoT control region may skip the first few OFDM symbols of the first slot to avoid collision with a wideband control region of the underlying LTE carrier.

A reference signal, e.g., Narrowband Reference Signal, may be present in the control region. A UE may use the reference signal to demodulate data symbols of the control channel In some cases, an NRS may occupy various resource elements (e.g., a RE 330) distributed in the last two OFDM symbols of the first and the second slots. One or more antenna ports may be configured for the reference signal.

Excluding NRS resources elements and other resource elements not used for NPDCCH, e.g., those for Cell-Specific Reference Signal (not shown), resource elements in the sub-region 320 or the sub-region 321 may constitute a Narrowband Control Channel Element (NCCE), to which data symbols of an NPDCCH are mapped. For example, NCCE0 may be in the sub-region 320, and NCCE1 the sub-region 321. An NPDCCH may occupy either one or both of the two NCCEs, corresponding to aggregation level "1" for one NCCE or "2" for two NCCEs. In some cases, an NPDCCH associated with paging (i.e., scrambled by P-RNTI) may occupy the two NCCEs of a subframe.

A UE generally performs blind decoding when searching the common search space 310 for a control channel because the UE may not know precisely how many times the control channel is repeated, for example. A UE may try to decode the control channel assuming one repetition (R=1), two repetitions (R=2), and so on. Such a hypothesis may be referred to as a paging candidate for a particular number of repetitions. As used herein, the term "repetition" includes the initial transmission (corresponding to R=1).

Figure 4:
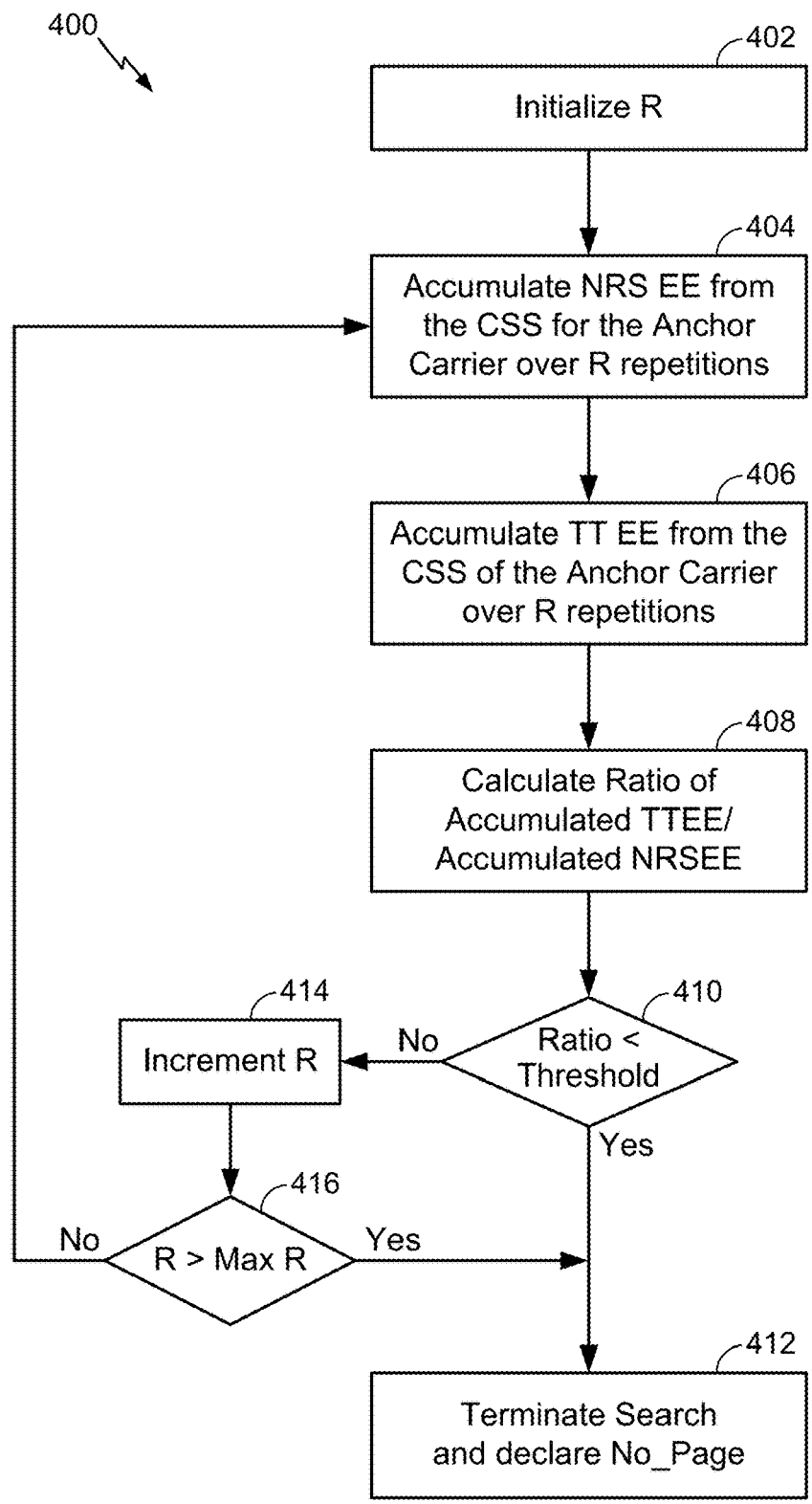
FIG. 4 illustrates a process that supports early termination for paging search in CSS on an anchor carrier in accordance with the present disclosure.

FIG. 4 illustrates, as an example, a process 400 that supports early termination for paging search in CSS on an anchor carrier in accordance with the present disclosure. The CSS may be an example of the common search space 310 in FIG. 3. A control channel carrying a paging indication may be repeated a number of times in the CSS. Denote by Rmax the maximal number of repetitions configured for the CSS. Generally a UE may search the CSS by attempting to decode multiple candidates for various number of repetitions of the control channel, for example, as described with reference to FIG. 3. The UE may utilize the process 400 to terminate the search before processing the full CSS (corresponding to Rmax repetitions).

At 402, the process 400 may start at a certain repetition value R (e.g., R=1 or another value). An implementation may choose a smaller starting R value, e.g., for potentially more power savings, such that termination may occur earlier.

At 404, energies of resource elements allocated to the NRS, denoted by NRSEE (or NRS Energy per Resource Element), may be measured and accumulated over the CSS region corresponding to R repetitions (which may be a partial CSS region if R is less than Rmax). For the anchor carrier, NRS may be always present in the CSS.

At 406, energies of resource elements allocated to the control channel (specifically its traffic/data tones), denoted by TTEE (or Traffic Tone Energy per Resource Element), may be measured and accumulated over the CSS region corresponding to the R repetitions. The control channel may or may not be present depending on whether paging is present in the CSS. For example, even though a UE may be configured to monitor paging on a particular CSS (corresponding to a paging occasion), the UE may not be paged in the CSS because a base station may not have sent the control channel (associated with paging) in the CSS.

At 408, a ratio of TTEE to NRSEE may be calculated, which may be regarded as a Traffic to Pilot (T2P) ratio of the control channel. The presence or absence of the control channel may be discerned based on the TTEE-to-NRSEE ratio: a low reading on the ratio may indicate that the control channel is absent, which may in turn imply that paging is absent.

At 410, the calculated ratio is compared with a threshold. If the ratio is less than the threshold, then at 412, the paging search may be terminated at repetition R and the UE may declare no paging is present or found during the paging occasion associated with the full CSS. Otherwise, at 414, R may be incremented, and the process returns to 404 if R does not exceed a maximal value for R (e.g., Rmax, the maximal numbers of repetitions supported by the CSS) at 416.

The threshold at 410 may be based on a known transmit power ratio of the NRS and the control channel (e.g., NPDCCH). For example, A UE may know or can assume that the ratio of transmission EPRE (energy per resource element) of NPDCCH to NRS may be 0 dB for one transmit antenna or −3 dB for two transmit antennas, which may imply that receive energy of NPDCCH and NRS are expected to be roughly equal (with the number of transmit antennas taken into account), or about 0 dB in terms of TTEE-to-NRSEE ratio. To determine the threshold, a margin (e.g., 10 dB) may be subtracted to the expected ratio (e.g., 0 dB) for measurement noises or other imperfections. For example, if a TTEE is below NRSEE by 10 dB (i.e., the threshold is −10 dB), then likely a base station may not have sent the control channel the UE is searching for. In such a case, the UE may with some confidence declare that paging is not present and skip the full searching of the CSS.

Figure 5:
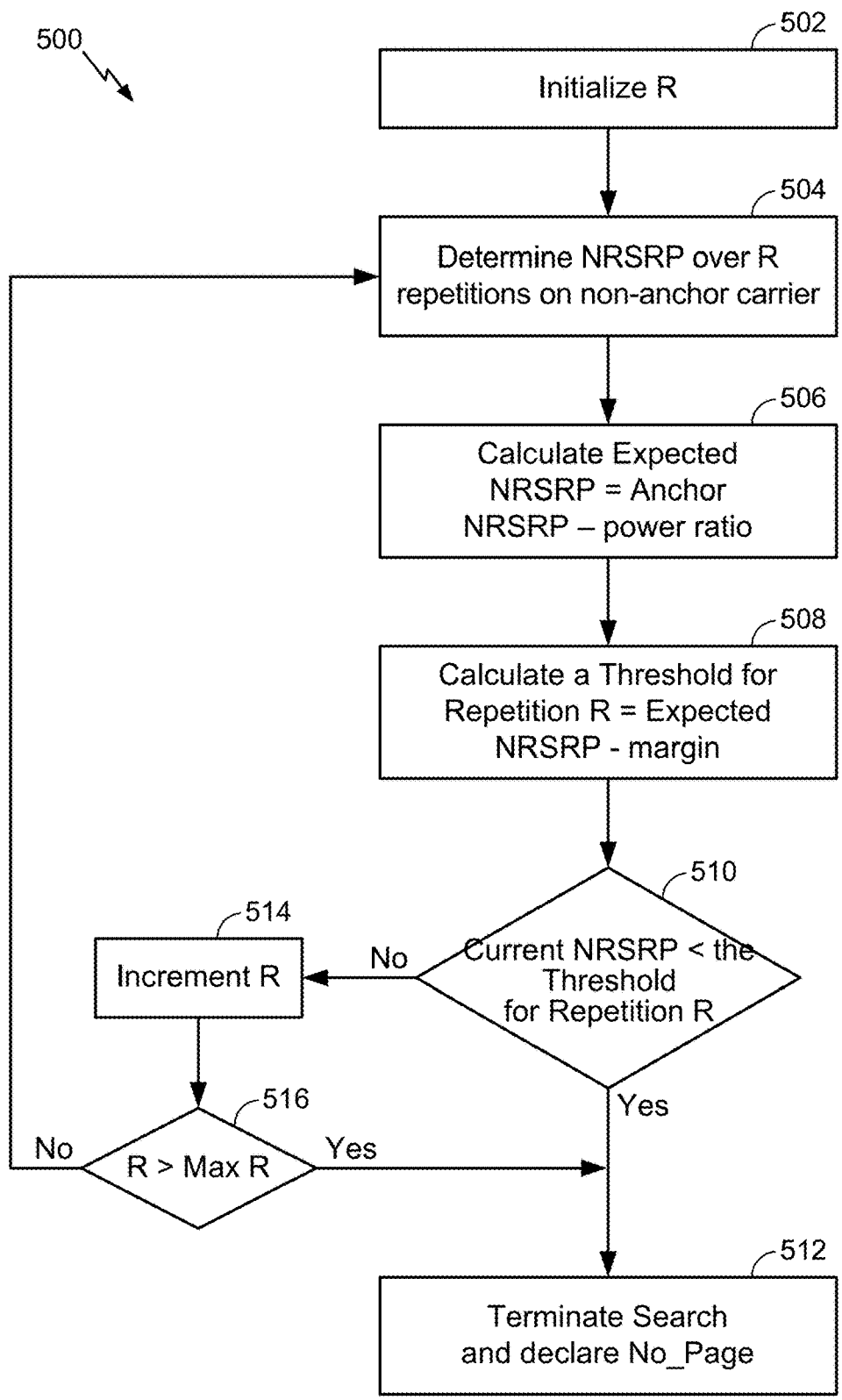
FIG. 5 illustrates a process that supports early termination for paging search in CSS on a non-anchor carrier in accordance with the present disclosure.

FIG. 5 illustrates, as an example, a process 500 that supports early termination for paging search in CSS on a non-anchor carrier in accordance with the present disclosure. In contrast to an anchor carrier, a non-anchor carrier may or may not contain NRS if a paging indication is not present in the CSS, but will contain NRS if paging is present. Thus, if a UE can detect the absence of NRS in the CSS, then the UE may infer that the paging is absent and hence the search for paging in the CSS can be terminated.

At 502, the process 500 may start at a certain repetition value (R), and similarly to 402 in FIG. 4, an implementation may choose a smaller starting R value such that termination may occur earlier.

At 504, the reference signal receive power (RSRP) of the NRS (or NRSRP) may be determined corresponding to R repetitions. NRSRP may be calculated as a linear average over the power contributions of the resource elements that carry NRS within the a frequency bandwidth (e.g., within a RB). In some cases, the NRSRP may be accumulated or averaged over one or more subframes in the CSS region corresponding to R repetition.

At 506, an expected value of NRSRP of the non-anchor carrier may be calculated from NRSRP of an anchor carrier based on a power ratio between the anchor carrier and the non-anchor carrier (e.g., the non-anchor carrier's expected NRSRP=anchor carrier's NRSRP−the power ratio).

At 508, a threshold for repetition R may be calculated based on the expected value of NRSRP. A margin may be applied to the expected value of NRSRP to determine the value of the threshold (e.g., the threshold=expected NRSRP−margin). For example, the margin may be chosen so that NRS likely would be absent if its power is below the expected value by a substantial amount.

At 510, for the repetition R, the NRSRP is compared with the threshold. If the NRSRP is less than the threshold, then at 512, the paging search may be terminated at repetition R and the UE may declare no paging is present during the paging occasion associated with the full CSS. Otherwise, at 514, R may be incremented, and the process returns to 504 if R does not exceed a maximal value for R at 516.

Although described with respect to an anchor carrier with reference to FIG. 4, the process 400 may be adapted to a non-anchor carrier and/or combined with the process 500. For a non-anchor carrier, the process 500 may detect the absence of NRS (e.g., if NRSRP is below a threshold at 510) and consequently may terminate the paging search in the CSS. However, in some cases NRS may be detected in the CSS (such as when the NRSRP is substantially above the threshold), even though the control channel for paging is not transmitted in the CSS. In such a scenario, a TTEE-to-NRSEE ratio can be used to detect the presence of the control channel, in ways similar to the process 400, except that the CSS is on the non-anchor carrier rather than on an anchor carrier.

Figure 6:
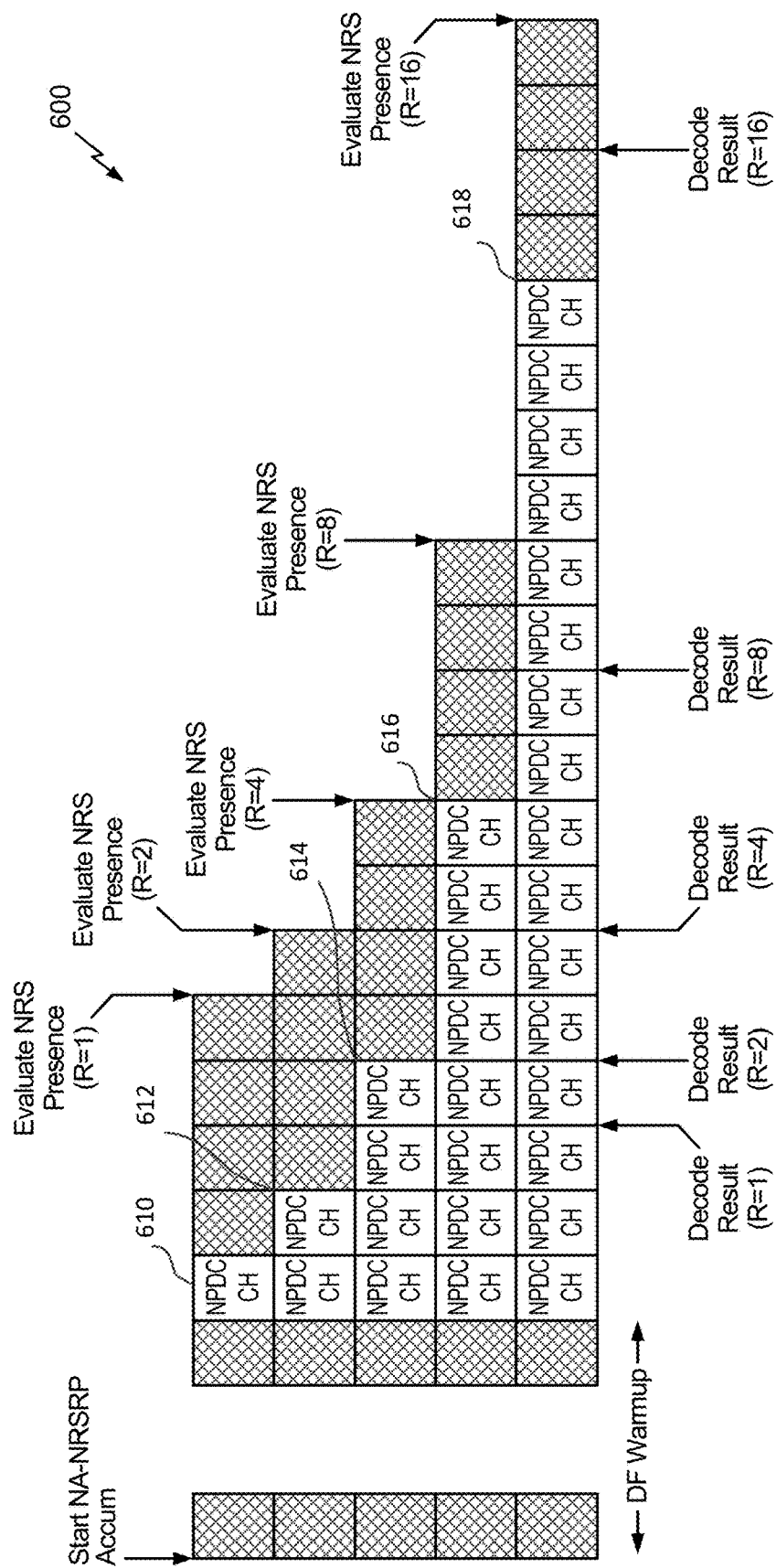
FIG. 6 illustrates a timeline that supports early termination for paging search in CSS in accordance with the present disclosure.

FIG. 6 illustrates, as an example, a timeline 600 that supports early termination for paging search in CSS in accordance with the present disclosure. Although the timeline 600 is illustrated with respect to an non-anchor carrier, similar timelines may apply to an anchor carrier; for example, a UE may evaluate a power ratio of a control channel to a reference signal (e.g., TTEE-to-NRSEE ratio) for the presence of the control channel, instead of or in addition to evaluating a reference signal receive power (e.g., NRSRP) for the presence of the reference signal.

A UE may search the CSS with respect to one or more paging candidates to decode a potential paging indication. For example, the UE may perform blind decoding of a control channel (e.g., NPDCCH) for various paging candidates, e.g., as described with reference to FIG. 3. For a paging candidate for R repetitions, the control channel may be repeated in a region of CSS containing, e.g., R consecutive subframes. For example, paging candidates 610, 612, 614, 616, or 618 corresponding to R being 1, 2, 4, 8, or 16, respectively, may occupy 1, 2, 4, 8, or 16 consecutive NPDCCH subframes.

For a paging candidate of R repetitions, a UE may process NRS and decode NPDCCH, assuming NPDCCH is repeated in R subframes. Implementations may introduce certain delays: NPDCCH decoding result may be available a certain time after the last repeated NPDCCH subframe, and so is evaluation for the presence of NRS. For example, FIG. 6 illustrates a 2-subframe delay in NPDCCH decoding and 4-subframe delay in NRS-presence evaluation.

Based on the result of NRS evaluation, a UE may terminate processing for a paging candidate currently being decoded or not-yet decoded. Consider, for example, a paging candidate for R=1. A UE may obtain the decoding result 2 subframes after the initial NPDCCH transmission. If the decoding for R=1 is successful, the UE may successfully exit the paging search in the CSS and declare a paging is found. Otherwise, the UE may try to decode a next paging candidate (e.g., corresponding to R=2 or 4). In the meantime, the UE may evaluate NRS presence (e.g., according to the process 500). The evaluation result may not be available until 4 subframes after the first NPDCCH subframe, which is after the time that the NPDCCH decoding result for R=2 would be available but before the time for R=4. If the decoding for R=2 succeeds, the UE may exit the paging search with a decoded paging. But if the decoding for R=2 fails and the absence of NRS is detected (e.g., when the NRSRP is less than the threshold at 510), the UE may terminate further decoding (e.g., for R=4, 8, 16, and so on) and declare no paging is present. Thus, a UE may terminate the search for paging without processing the remaining subframes of the full CSS.

Figure 7:
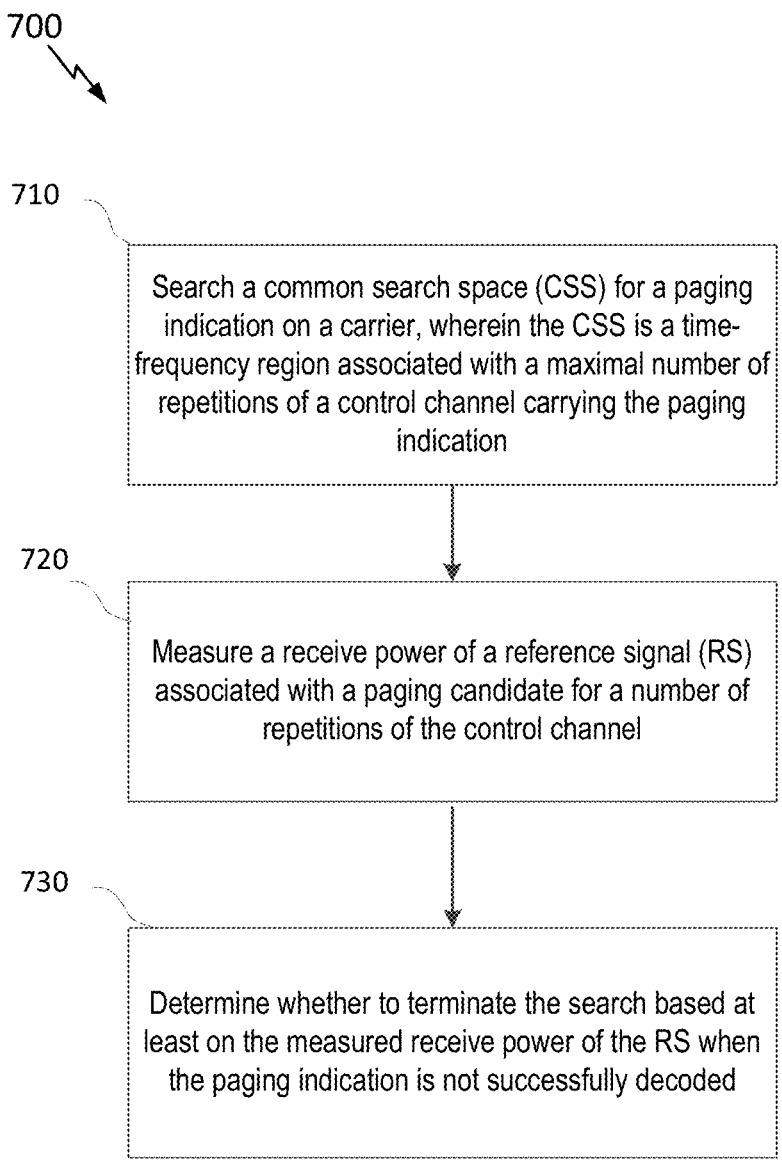
FIG. 7 illustrates a method that supports early termination for paging search in CSS in accordance with the present disclosure.

FIG. 7 illustrates, as an example, a method 700 that supports early termination for paging search in CSS in accordance with the present disclosure. The method 700 may encompass various aspects of the processes 400 and 500 and the timeline 600, described with reference to FIGS. 4-6. A UE (or one or more of its components) may implement the method 700 using hardware, firmware, or software, or a combination thereof.

At 710, a common search space on a carrier may be searched for a paging indication. The CSS may be a time-frequency region associated with a maximal number (Rmax) of repetitions of a control channel carrying the paging indication. The time-frequency resources of the CSS may be provisioned so that the CSS can support the Rmax repetitions of the control channel if a base station so chooses. The value of Rmax may be signaled to the UE by the base station (or generally the network). The CSS may be an example of an NB-IoT CSS for paging as described with reference to FIG. 3.

The control channel may be repeated in time and/or frequency domain. For example, the CSS may comprise consecutive Rmax NPDCCH subframes, supporting Rmax repetitions of NPDCCH in time. In some cases, Rmax may be as large as 2048 subframes. A system may provision a larger Rmax to provide deeper coverage for some UEs, even though for other UEs (e.g., those with better channel conditions) a smaller number of repetitions (R less than Rmax) may suffice for successful decoding of NPDCCH. The repetition may be achieved in variety of ways, such as, based on symbol duplications, redundancy versions, and so on, as long as same information payload is associated with the repetition. Channel repetition generally increases energy per information bit, which helps improving coverage for UEs with weaker radio conditions.

The CSS-search may generally involve "blind decoding," if a UE does not know in advance how many times the control channel would be repeated in the CSS. A set of paging candidates may be identified for multiple (potential) numbers of repetition. The paging candidate for Rmax generally is associated with the full CSS and, in some cases, represents a worst case scenario in terms of processing delay and power consumption. The potential numbers of repetitions may depend on the value of Rmax. For examples, for a particular (configurable) value of Rmax, the CSS may only allow certain repetition R values (e.g., R=1, 2, 4, 8, 16, 32, 64, or 128, for Rmax=128). For a paging candidate of R repetitions, the control channel is assumed to repeat R times within a region of the CSS, e.g., R consecutive NPDCCH subframes. Rmax corresponds to the full CSS region, while R less than Rmax corresponds to a partial CSS region. The set of paging candidates may be decoded for the paging indication. If a paging candidate is successfully decoded, a UE may exit the paging search; otherwise the UE may try to decode another paging candidate.

At 720, a receive power of a reference signal may be measured corresponding to a paging candidate for a number of repetitions of the control channel within the CSS. The RS may be an NB-IoT NRS. For the paging candidate with R repetitions, the RS may be assumed to accompany the repeated control channel, e.g., within R consecutive NPDCCH subframes. The receive power of the RS may be based on an energy metric (e.g., NRSEE) or NRSRP value as described with reference to FIGS. 4 and 5.

At 730, a UE may determine whether to terminate the paging search based at least on the measured receive power of the RS when the paging indication is not successfully decoded. Thus, a UE may declare no paging is present without searching the full CSS.

In an aspect, a receive power of the control channel may be measured associated with the paging candidate for R repetitions. The paging search may be terminated if a ratio of the measured receive power of the control channel to the measured receive power of the RS (i.e., a receive power ratio of the control channel to the RS) is less than a threshold, for example, as described with reference to FIG. 4. In particular, the ratio may be based on receive energy per resource element, e.g., TTEE/NRSEE. In some cases, a UE may measure the receive powers of the control channel and the RS using accumulated receive energy metrics of resource elements allocated respectively to the control channel and the RS associated with the paging candidate for R repetitions.

The threshold may be based on a known transmit power ratio between the control channel and the RS, and may be further adjusted by a margin. For example, if a base station transmit the control channel and the RS with the same power (adjusted for the number of transmit antennas), then the receive power ratio between the control channel and the RS may be expected to be 0 dB. An implementation may set a margin so that if the receive power ratio of the control channel to the RS is below the 0 dB by more than the margin, it may be likely that the control channel is absent.

The receive power ratio based detection of the control channel may apply to an anchor carrier as well as an non-anchor carrier, as long as the RS may be assumed or detected to be present in the CSS. The term "anchor" versus "non-anchor" carrier may denote certain distinction in how a carrier may be used, e.g., whether a carrier may serve as an anchor for system acquisition and/or control. For example, an NB-IoT anchor carrier may be preconfigured to regularly carry certain signals and channels (e.g., NRS, NPBCH), whereas an NB-IoT non-anchor carrier may not guarantee the transmission of certain signals or channels (e.g., NRS) in all instances.

In another aspect, the paging search may be terminated if the measured receive power of the RS is less than a threshold, e.g., as described with reference to FIG. 5. The threshold may be chosen for the detection of the absence of the RS, such as when paging is not present in the CSS on a non-anchor carrier. In some cases, the threshold may be based on an expected power of the RS, which may be derived from a receive power of an anchor carrier based on a power offset between the anchor carrier and the non-anchor carrier. For example, an expected NRSRP value of the non-anchor carrier may be given by a measured NRSRP of an anchor carrier (whose NRS may be assumed to be present) adjusted by a power offset between the two carriers. The power offset may be signaled to a UE or otherwise be known to the UE. A UE may also apply a margin to the expected RS power to account for measurement noise and/or other considerations.

Figure 8:
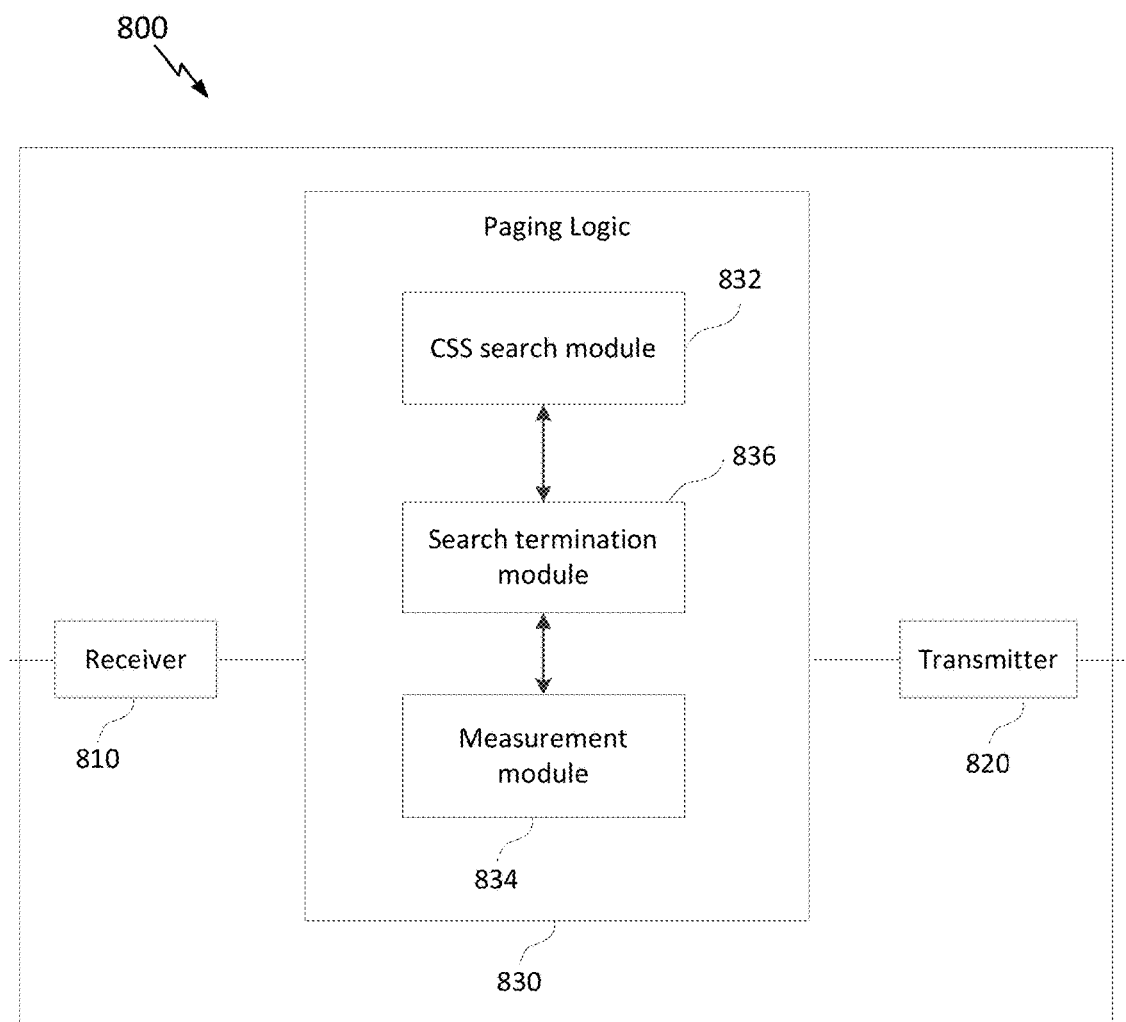
FIG. 8 illustrates an apparatus that supports early termination for paging search in CSS in accordance with the present disclosure.

FIG. 8 illustrates, as an example, an apparatus 800 that supports early termination for paging search in CSS in accordance with the present disclosure. The apparatus 800 may include a receiver 810, a transmitter 820, and a paging logic 830, and may perform various aspects of the processes 400 and 500, the timeline 600, and the method 700 described with reference to FIGS. 4, 5, 6 and 7. The apparatus 800 may be embodied by, or resides within, a UE 115 (e.g., an IoT device supporting NB-IoT) with reference to FIG. 1.

The receiver 810 may receive information such as packets, user data, or control information associated with various information channels. Information may be passed on to other components of the apparatus. The receiver 810 may utilize a single antenna or a set of multiple antennas. The receiver 810 may be configured to receive a reference signal (e.g., NRS) and a control channel (e.g., NPDCCH) in connection with paging search on a carrier.

The transmitter 820 may transmit signals generated by other components of the apparatus. In some examples, the transmitter 820 may be collocated with a receiver 810 in a transceiver module. The transmitter 820 may utilize a single antenna or a set of multiple antennas.

The receiver 810 and transmitter 820 (or a transceiver incorporating both) may be coupled to the paging logic 830 and may provide means for communications between the apparatus 800 with a base station.

The paging logic 830 may be a baseband modem or an application processor or may illustrate aspects of a baseband or application processor. The paging logic 830 or at least some of its various sub-components may be implemented in hardware, software executed by a processor, firmware, or any combination thereof. If implemented in software executed by a processor, the functions of the paging logic 830 or at least some of its various sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure. Software may comprise codes or instructions stored in a memory or like medium that is connected or in communication with the processor described above. The codes or instructions may cause the processor, the apparatus 800, or one or more components thereof to perform various functions described herein.

The paging logic 830 or at least some of its various sub-components may be physically located at various positions, including being distributed such that portions of functions are implemented at different physical locations by one or more physical devices. In some examples, the paging logic 830 or at least some of its various sub-components may be a separate and distinct component, or in other examples, may be combined with one or more other hardware components, including but not limited to an I/O component, a transceiver, a server, another computing device, one or more other components described in the present disclosure, or a combination thereof in accordance with various aspects of the present disclosure.

The paging logic 830 may control, coordinate, or execute various functions related to the search for a paging on a carrier. For example, the paging logic 830 may determine a paging occasion to search for a potential paging indication, identify a common search space associated with the paging occasion, search the CSS to decode a control channel carrying the paging indication, report the result of paging search, and so on. The paging logic 830 may further include a CSS search module 832, a measurement module 834, and a search termination module 836.

The CSS search module 832 may provide means for searching the CSS for the paging indication and may, for example, be configured to perform the method 700 at 710. The CSS may be a time-frequency region associated with a maximal number of repetitions of the control channel. The CSS search module 832 may be configured to "blind decode" various hypotheses on control channel repetition for the paging candidate. As described above, such a hypothesis may be referred to as a paging candidate for which the control channel may repeat a number of times in the CSS. A paging candidate for repetition R may occupy a partial CSS region if R is less than Rmax, the maximal number of repetitions configured for the CSS. Generally speaking, a set of paging candidates may be identified for multiple numbers of repetitions, which may include Rmax corresponding to the full CSS region. The set of paging candidates may be decoded for the paging indication.

The measurement module 834 may provide means for measuring a receive power of the reference signal and/or the control channel, corresponding to a paging candidate for a number of repetitions of the control channel, and may, for example, be configured to perform the method 700 at 720. An NRS and NPDCCH of an NB-IoT carrier may be measured. For a paging candidate for R repetitions, the NRS and NPDCCH may be assumed to occupy R subframes. The receive power of the control channel or the RS may be measured in terms of various power or energy metrics, such as TTEE, NRSEE or NRSRP described with reference to FIGS. 4 and 5. In some cases, the receive powers of the control channel and the RS may be measured based on accumulated receive energy metrics of resource elements allocated respectively to the control channel and the RS associated with the paging candidate for R repetitions.

The search termination module 836 may provide means for determining whether to terminate the search based at least on the measured receive power of the RS when the paging indication is not successfully decoded, and may, for example, be configured to perform the method 700 at 730. The search termination module 836 may further control operations of the CSS search module 832 and the measurement module 834, as illustrated in the example timeline 600 described with reference to FIG. 6. For example, the search termination module 836 may obtain the receive power measurements of the RS and/or the control channel from the measurement module 834. Furthermore, the search termination module 836 may also obtain a decoding result from the CSS search module 832 for a paging candidate. If the paging indication has been successfully decoded, the search termination module 836 may conclude the paging search. In some cases, a successful decoding result may override an otherwise early termination determination based on the receive power of the RS (and the control channel in some cases). But if the paging indication has not been successfully decoded, the search termination module 836 may terminate the paging search and may declare no paging is present in the CSS without the full CSS being searched.

In an aspect, the search may be terminated if a ratio of the measured receive power of the control channel to the measured receive power of the RS is less than a threshold, for example, as described with reference to FIG. 4. The threshold may be based on a known transmit power ratio between the control channel and the RS, and may be further adjusted by a margin.

In another aspect, the search may be terminated if the measured receive power of the RS is less than a threshold, e.g., as described with reference to FIG. 5. The threshold may be based on an expected power of the RS, which may be derived from a receive power of an anchor carrier based on a power offset between the anchor carrier and the non-anchor carrier. The power offset may be signaled to a UE or otherwise be known to the UE. A margin may be applied to the expected RS power, e.g., due to measurement noise and/or other considerations.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include random access memory (RAM), read-only memory (ROM), electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of wireless communication, comprising:
   searching a common search space (CSS) for a paging indication on a carrier, wherein the CSS is a time-frequency region associated with a maximal number of repetitions of a control channel carrying the paging indication;
   measuring a receive power of a reference signal (RS) associated with a paging candidate for a number of repetitions of the control channel; and
   determining whether to terminate the search based at least on the measured receive power of the RS when the paging indication is not successfully decoded.

2. The method of claim 1, wherein searching the CSS for the paging indication comprises:
   identifying a set of paging candidates for multiple numbers of repetitions of the control channel within the CSS; and
   decoding the set of paging candidates for the paging indication.

3. The method of claim 1, further comprising:
measuring a receive power of the control channel associated with the paging candidate; and
wherein the search is determined to be terminated if a ratio of the measured receive power of the control channel to the measured receive power of the RS is less than a threshold.

4. The method of claim 3, wherein the threshold is based on a known transmit power ratio between the control channel and the RS.

5. The method of claim 3, wherein the receive powers of the control channel and the RS are measured based on accumulated receive energy metrics of resource elements allocated respectively to the control channel and the RS associated with the paging candidate.

6. The method of claim 3, wherein the carrier is an anchor carrier.

7. The method of claim 1, wherein the search is determined to be terminated if the measured receive power of the RS is less than a threshold.

8. The method of claim 7, wherein the threshold is based on an expected power of the RS.

9. The method of claim 8, wherein the carrier is a non-anchor carrier and the expected power of the RS is derived from a receive power of an anchor carrier based on a power offset between the anchor carrier and the non-anchor carrier.

10. The method of claim 1, wherein the carrier is a NarrowBand Internet of Things (NB-IoT) carrier, the RS is a Narrowband Reference Signal (NRS), and the control channel is a Narrowband Physical Downlink Control Channel (NPDCCH).

11. A user equipment (UE), comprising:
a receiver configured to receive a reference signal (RS) and a control channel on a carrier; and
a processor, coupled to a memory, the processor configured to:
search a common search space (CSS) for a paging indication on the carrier, wherein the CSS is a time-frequency region associated with a maximal number of repetitions of the control channel carrying the paging indication;
measure a receive power of the RS associated with a paging candidate for a number of repetitions of the control channel; and
determine whether to terminate the search based at least on the measured receive power of the RS when the paging indication is not successfully decoded.

12. The UE of claim 11, wherein the processor configured to search the CSS for the paging indication comprises the processor configured to:
identify a set of paging candidates for multiple numbers of repetitions of the control channel within the CSS; and
decode the set of paging candidates for the paging indication.

13. The UE of claim 11, wherein the processor is further configured to:
measure a receive power of the control channel associated with the paging candidate; and
wherein the search is determined to be terminated if a ratio of the measured receive power of the control channel to the measured receive power of the RS is less than a threshold.

14. The UE of claim 13, wherein the threshold is based on a known transmit power ratio between the control channel and the RS.

15. The UE of claim 13, wherein the receive powers of the control channel and the RS are measured based on accumulated receive energy metrics of resource elements allocated respectively to the control channel and the RS, corresponding to the paging candidate.

16. The UE of claim 13, wherein the carrier is an anchor carrier.

17. The UE of claim 11, wherein the search is determined to be terminated if the measured receive power of the RS is less than a threshold.

18. The UE of claim 17, wherein the threshold is based on an expected power of the RS.

19. The UE of claim 18, wherein the carrier is a non-anchor carrier and the expected power of the RS is derived from a receive power of an anchor carrier based on a power offset between the anchor carrier and the non-anchor carrier.

20. The UE of claim 11, wherein the carrier is a NarrowBand Internet of Things (NB-IoT) carrier, the RS is a Narrowband Reference Signal (NRS), and the control channel is a Narrowband Physical Downlink Control Channel (NPDCCH).

21. An apparatus of wireless communication, comprising:
means for searching a common search space (CSS) for a paging indication on a carrier, wherein the CSS is a time-frequency region associated with a maximal number of repetitions of a control channel carrying the paging indication;
means for measuring a receive power of a reference signal (RS) associated with a paging candidate for a number of repetitions of the control channel; and
means for determining whether to terminate the search based at least on the measured receive power of the RS when the paging indication is not successfully decoded.

22. The apparatus of claim 21, wherein the means for searching the CSS for the paging indication comprises:
means for identifying a set of paging candidates for multiple numbers of repetitions of the control channel within the CSS; and
means for decoding the set of paging candidates for the paging indication.

23. The apparatus of claim 21, further comprising:
means for measuring a receive power of the control channel associated with the paging candidate; and
wherein the search is determined to be terminated if a ratio of the measured receive power of the control channel to the measured receive power of the RS is less than a threshold.

24. The apparatus of claim 23, wherein the threshold is based on a known transmit power ratio between the control channel and the RS.

25. The apparatus of claim 21, wherein the search is determined to be terminated if the measured receive power of the RS is less than a threshold.

26. The apparatus of claim 25, wherein the threshold is based on an expected power of the RS.

27. The apparatus of claim 26, wherein the carrier is a non-anchor carrier and the expected power of the RS is derived from a receive power of an anchor carrier based on a power offset between the anchor carrier and the non-anchor carrier.

28. A non-transitory computer-readable medium having instructions stored thereon, the instructions comprising codes executable for a UE to perform:
searching a common search space (CSS) for a paging indication on a carrier, wherein the CSS is a time-frequency region associated with a maximal number of repetitions of a control channel carrying the paging indication;

measuring a receive power of a reference signal (RS) associated with a paging candidate for a number of repetitions of the control channel; and determining whether to terminate the search based at least on the measured receive power of the RS when the paging indication is not successfully decoded.

29. The non-transitory computer-readable medium of claim 28, wherein the instructions further comprises:

codes for measuring a receive power of the control channel associated with the paging candidate; and wherein the search is determined to be terminated if a ratio of the measured receive power of the control channel to the measured receive power of the RS is less than a threshold.

30. The non-transitory computer-readable medium of claim 28, wherein the search is determined to be terminated if the measured receive power of the RS is less than a threshold.

* * * * *